United States Patent [19]

Johnson et al.

[11] 4,385,964
[45] May 31, 1983

[54] METHOD FOR PREVENTING THE UNDESIRABLE CONDENSATION OF ALUMINUM CHLORIDE IN A FRACTIONAL DISTILLATION COLUMN

[75] Inventors: Roger C. Johnson, Randolph, N.J.; Donald L. Stewart, Jr., Greensburg, Pa.; Utah Tsao, Jersey City, N.J.; David A. Wohleber, Lower Burrell, Pa.

[73] Assignee: Aluminum Company of America, Pittsburgh, Pa.

[21] Appl. No.: 382,312

[22] Filed: May 26, 1982

Related U.S. Application Data

[63] Continuation of Ser. No. 246,022, Mar. 20, 1981, abandoned, which is a continuation-in-part of Ser. No. 40,945, May 21, 1979, abandoned.

[51] Int. Cl.$^3$ .............................................. B01D 3/14
[52] U.S. Cl. ........................................ 203/50; 55/71; 55/72; 75/68 B; 203/75; 203/77; 203/78; 203/82; 203/84; 423/135; 423/463; 423/495

[58] Field of Search ...................... 55/71, 72; 423/135, 423/463, 495, 496, 210; 75/68 B, 68 R; 203/71, 73–75, 77, 78, 50, 80–85, 91, 94

[56] References Cited

U.S. PATENT DOCUMENTS 2,387,228 10/1945 Arnold ................................. 423/135
4,035,169 7/1977 Sebenik et al. ......................... 55/71

Primary Examiner—Frank Sever
Attorney, Agent, or Firm—Daniel A. Sullivan, Jr.

[57] ABSTRACT

A method is disclosed for preventing the condensation of aluminum chloride (AlCl$_3$) in a fractional distillation column which is operated to separate a fraction which does not include AlCl$_3$ from a mixture containing AlCl$_3$ and other metal chlorides and which is operated at temperatures which include the sublimation or melting points of AlCl$_3$ at the operating pressure of the column. According to this method, titanium tetrachloride (TiCl$_4$) is maintained in the column in an amount at least as great, by weight, as the amount of AlCl$_3$ contained in the mixture.

18 Claims, 2 Drawing Figures

METHOD FOR PREVENTING THE UNDESIRABLE CONDENSATION OF ALUMINUM CHLORIDE IN A FRACTIONAL DISTILLATION COLUMN

CROSS-REFERENCE TO A RELATED APPLICATION

This application is a continuation of U.S. patent application Ser. No. 246,022, Mar. 20, 1981, now abandoned, which is a continuation-in-part of U.S. patent application Ser. No. 40,945, filed May 21, 1979 now abandoned.

BACKGROUND OF THE INVENTION

This invention relates to the operation of a fractional distillation column in such a way as to prevent the undesirable condensation of $AlCl_3$ therein. More particularly, this invention relates to the operation of a fractional distillation column in such manner in a process for separating $AlCl_3$ from a mixture containing metal chlorides.

As used herein, in accordance with common trade practice, the term "metal chloride" includes silicon tetrachloride ($SiCl_4$).

In a process for the production of metal chlorides by the chlorination of a material containing metal oxides, a mixture of chlorides and non-condensable gases will be obtained. For example, in a process for the production of $AlCl_3$ by the chlorination of kaolin clay in the presence of a carbonaceous reducing agent, a mixture of metal chlorides, including $AlCl_3$, $FeCl_3$, $SiCl_4$ and $TiCl_4$ will be obtained. Also obtained will be various non-condensable gases (at the temperatures and pressures encountered in the chlorination system) such as carbon monoxide (CO), carbon dioxide ($CO_2$) and chlorine ($Cl_2$), chlorides such as hydrogen chloride (HCl) and phosgene ($COCl_2$), and small amounts of other metal chlorides such as calcium chloride ($CaCl_2$) and sodium chloride (NaCl). Nitrogen ($N_2$) may be added as a purge gas to the process; consequently, the mixture of chlorides and non-condensable gases obtained may also include $N_2$ (a non-condensable gas at the temperatures and pressures encountered in the system).

Various processes for the separation of metal chlorides from a mixture of chlorides and non-condensable gases are known. Several of these processes involve the selective condensation or fractional distillation of particular metal chlorides from the mixture. Thus, for example, U.S. Pat. No. 2,387,228 of Arnold describes a two-stage fractional distillation process for the separation of $AlCl_3$ from a mixture containing $AlCl_3$, $FeCl_3$, $SiCl_4$ and $TiCl_4$. According to this process, the mixture is introduced into a first distillation column, which is operated at temperatures and pressures sufficient to separate the mixture into a gaseous fraction, which consists mainly of $SiCl_4$ and $TiCl_4$, and a liquid fraction, which consists mainly of $AlCl_3$ and $FeCl_3$. The liquid fraction from the first column is then introduced into a second distillation column, which is operated at temperatures and pressures sufficient to separate $AlCl_3$ in the gaseous state from the liquid fraction.

Another process for the separation of $AlCl_3$ from a mixture containing $AlCl_3$ and other metal chlorides is disclosed in the commonly owned, copending application of Stewart, entitled "Fractional Distillation Process For The Production of Aluminum Chloride", Ser. No. 224,280, filed Jan. 12, 1981. According to this process, the mixture is introduced into a first distillation column, which is operated at temperatures and pressures sufficient to separate $FeCl_3$ from the mixture, while avoiding the formation of a solid solution of $FeCl_3$ and $AlCl_3$ within the column. At least one additional distillation column is then utilized to remove $AlCl_3$ from the remaining mixture of metal chlorides obtained from the first column.

Other known processes for the fractional distillation or selective condensation of particular metal chlorides from a mixture of chlorides include that of U.S. Pat. No. 3,436,211 of Dewing and that of U.S. Pat. No. 3,786,135 of King et al. The Dewing process operates to remove calcium chloride ($CaCl_2$) and magnesium chloride ($MgCl_2$) from a gaseous mixture containing these chlorides and $AlCl_3$, and the King process operates to selectively condense sodium aluminum chloride ($NaAlCl_4$) from the gaseous effluent derived from the chlorination of alumina which is contaminated with sodium.

Unfortunately, however, problems have arisen in many instances where a fractional distillation or selective condensation procedure has been utilized to separate a particular fraction from a mixture of metal chlorides. Such problems may arise because the range of temperatures in distillation columns operated at convenient pressures for the separation of particular metal chlorides from the mixture may include temperatures at which undesirable condensation of other metal chlorides takes place. Thus, for example, as described in the aforementioned application of Stewart, Ser. No. 224,280, the formation of a solid solution of $AlCl_3$ and $FeCl_3$ may interfere with the operation of a fractional distillation process for the separation of $AlCl_3$ from a mixture containing $AlCl_3$ and other chlorides including $FeCl_3$. In the process of Stewart, the undesirable condensation of $AlCl_3$ and $FeCl_3$ in the form of a solid solution is avoided by operating the first distillation column at temperatures and pressures sufficient to separate $FeCl_3$ from the mixture while avoiding the formation of the undesirable solid solution.

A similar problem is discussed in U.S. Pat. No. 2,718,279 of Kraus, which describes a fractional condensation process involving the separation of $FeCl_3$ from a mixture of gases including $FeCl_3$ and $TiCl_4$. According to this reference, fractional condensation of such a mixture is hindered by the tendency of $FeCl_3$ to condense or precipitate on the interior surfaces of conventional condensing apparatus which are operated at convenient temperatures and pressures for the separation of $TiCl_4$ from the mixture. According to the method of Kraus, this problem is overcome by the washing of the $FeCl_3$ from the gaseous mixture with a continuous flow of liquid $TiCl_4$.

U.S. Pat. No. 2,870,869 of Mahler describes a problem which has accompanied the separation of $TiCl_4$ from a gaseous mixture containing $TiCl_4$ and other metal chlorides, including $AlCl_3$ and $FeCl_3$. According to this reference, the condensation of $TiCl_4$ from such a mixture may be accompanied by the formation of a considerable amount of finely divided solid particles of $AlCl_3$ and $FeCl_3$. According to the process of Mahler, this problem is solved by the provision of a chamber containing a slurry of solid $AlCl_3$ and $FeCl_3$ suspended in liquid $TiCl_4$. The slurry is maintained at a temperature close to but below the dew point of $TiCl_4$ and is agitated within the chamber so as to provide a turbulent shower therein. The gaseous mixture is then passed through the chamber and the gaseous $AlCl_3$ and $FeCl_3$ in the mixture are reportedly washed therefrom by contact with the turbulent shower.

Other processes for the separation of a particular fraction from a mixture containing metal chlorides have attempted to solve the problem of undesirable condensation of particular constituents in the mixture by employment of liquid chloride solvents or wash media. For example, U.S. Pat. No. 2,533,021 to Krchma describes the separation of $FeCl_3$ from a mixture of gases by dissolving the $FeCl_3$ in a solvent consisting of a mixture of molten $FeCl_3$ and NaCl. Similarly, U.S. Pat. No. 3,294,482 to Lerner describes the separation of $FeCl_3$ from a gaseous mixture of metal chlorides which contains the chlorides of iron, columbium, tungsten, molybdenum, and zirconium, by scrubbing the gaseous mixture with a molten mixture of $FeCl_3$ and NaCl.

U.S. Pat. Nos. 3,938,969 and 4,035,169 of Sebenik et al. refer to a method for separating $AlCl_3$ from a mixture of solids containing $FeCl_3$. According to this method, the mixture is washed with $TiCl_4$ to dissolve the $AlCl_3$, leaving a suspension of solid particles of $FeCl_3$ in a solution of liquid $AlCl_3$ and $TiCl_4$. According to the Sebenik patents, the solubility of $AlCl_3$ in $TiCl_4$ is relatively low; consequently, relatively large quantities of $TiCl_4$ are required to dissolve a quantity of $AlCl_3$, thereby making this method impractical. The Sebenik patents also describe a method by which $AlCl_3$ may be separated from a mixture of gaseous metal chlorides by washing the mixture with a solvent which preferentially dissolves $AlCl_3$ and which may dissolve $FeCl_3$, while failing to dissolve, or at most dissolving only sparingly other chlorides such as $SiCl_4$ and $TiCl_4$.

Another use for the application of a liquid metal chloride to a gaseous mixture of chlorides is discussed by Dr. Robert Powell on page 91 of a 1968 publication of the Noyes Development Corporation, entitled "Titanium Dioxide and Titanium Tetrachloride". He describes the evaporation of liquid $TiCl_4$ in a stream of chlorination gases to cool the stream.

SUMMARY OF THE INVENTION

It is an object of the present invention to provide a method for preventing the undesirable condensation of $AlCl_3$ in a fractional distillation column which is operated to separate a fraction which does not include $AlCl_3$ from a mixture containing $AlCl_3$ and other metal chlorides and which is operated at temperatures which include the sublimation or melting points of $AlCl_3$ at the operating pressure of the column. It is another object of this invention to incorporate such a method in a process for the separation and recovery of $AlCl_3$ from a mixture containing metal chlorides including $AlCl_3$, $FeCl_3$, $SiCl_4$ and $TiCl_4$.

In accordance with these and other objects, the present invention provides a method for preventing the condensation of $AlCl_3$ in a fractional distillation column which is operated to separate a fraction which does not include $AlCl_3$ from a mixture containing $AlCl_3$ and other metal chlorides and which is operated at temperatures which include the sublimation or melting points of $AlCl_3$ at the operating pressure of the column. According to this method, $TiCl_4$ is maintained in the column in an amount at least as great, by weight, as the amount of $AlCl_3$ contained in the mixture.

The present invention also incorporates the aforementioned method in a process for the separation and recovery of $AlCl_3$ from a mixture containing $AlCl_3$ and other metal chlorides. In one embodiment of this process, the method of the invention is utilized in connection with the operation of a fractional distillation column which is employed to separate $SiCl_4$ from a mixture containing $AlCl_3$, $FeCl_3$, $SiCl_4$ and $TiCl_4$. A second embodiment of this process utilizes the method of the invention in connection with the operation of a fractional distillation column which is employed to separate a fraction containing $SiCl_4$ and $TiCl_4$ and from a mixture containing $AlCl_3$, $FeCl_3$, $SiCl_4$ and $TiCl_4$.

In order to facilitate an understanding of the invention, its features are illustrated in the accompanying drawings and a detailed description thereof follows. It should be understood nevertheless that it is not intended that the invention be limited to the particular embodiments shown. Various changes and alterations are contemplated such as would ordinarily occur to one skilled in the art to which the invention relates.

DETAILED DESCRIPTION OF THE INVENTION

In a process for the production of metal chlorides by the chlorination of a material containing metal oxides, a mixture of chlorides and non-condensable gases will be obtained. The present invention may be utilized in the separation of particular metal chlorides from such a mixture.

Figure 1:
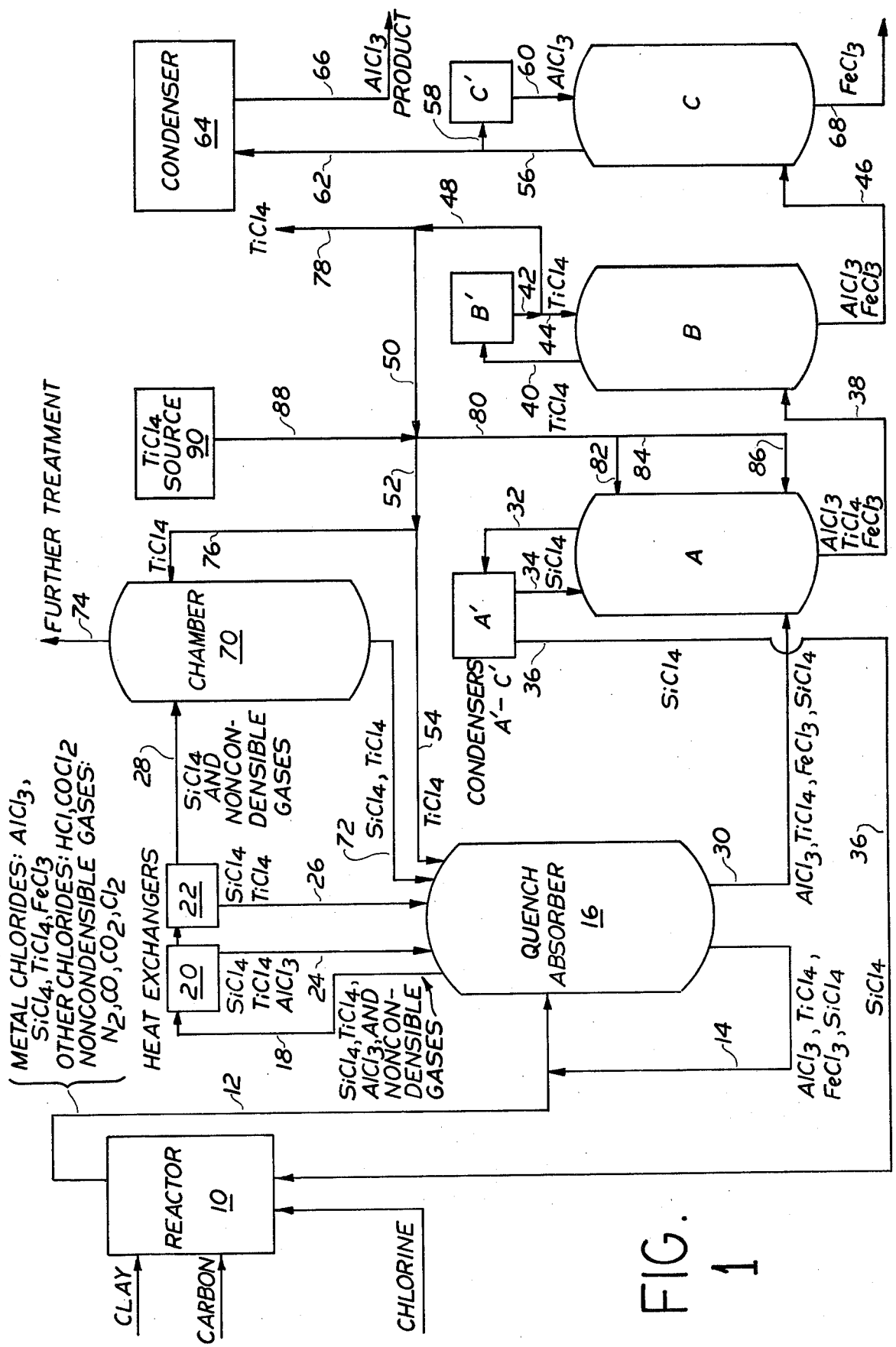
FIG. 1 is a schematic flow diagram generally illustrating the present invention as utilized in connection with the operation of an array of distillation columns in a process for the production of high-purity $AlCl_3$ from clay.

This invention may be particularly useful in connection with a process for the production of $AlCl_3$ by the chlorination of a material containing aluminum oxide in the presence of a carbonaceous reducing agent. Such a process is illustrated in FIG. 1, wherein kaolin clay is utilized as the source of aluminum oxide. Although the illustrated process is typical of the processes in which the invention may be useful, the preferred process conditions which are recited in connection with the description of the illustrated process are not properly considered to be limitations of the scope of the invention. As shown in FIG. 1, clay is charged to reactor 10, along with a carbon reductant, for reaction therein with chlorine gas, under conditions well known to those skilled in the art. The product of this reaction is a mixture of gaseous metal chlorides, other chlorides and non-condensable gases. This mixture typically includes gaseous metal chlorides in the following amounts:

| Metal Chloride | Percentage by Weight |
|---|---|
| $AlCl_3$ | 30–35 |
| $SiCl_4$ | 10–15 |
| $TiCl_4$ | 1–2 |
| $FeCl_3$ | 1–2 |
| $CaCl_2$ | trace |
| NaCl | trace |

The mixture obtained from the chlorination reactor also includes other chlorides such as HCl and $COCl_2$, and non-condensable gases such as $N_2$, CO, $CO_2$ and $Cl_2$, which constitute the major portion of the balance of the gaseous mixture.

In the process illustrated in FIG. 1, the gaseous mixture passes from reactor 10 through line 12 to quench absorber 16. Before the mixture reaches the quench absorber, however, it is cooled by the introduction thereinto of a recycle stream of metal chlorides which is passed out of quench absorber 16 through line 14. The introduction of this recycle stream typically reduces the temperature of the mixture in line 12 from about 600° C. at the reactor outlet to about 325° C. at the entrance of quench absorber 16. It will be apparent to those skilled in the art that the cooled mixture may also be passed through filters, cyclones or the like (not shown) for cleaning purposes.

Cooling of the mixture to about 325° C. does not condense the gaseous chlorides of silicon, titanium, aluminum and iron.

The following table sets forth the melting and boiling temperatures for the pertinent metal chlorides:

| Metal Chloride | °C. at One Atmosphere Pressure | |
| --- | --- | --- |
| | Melting Point | Boiling Point |
| $SiCl_4$ | −70 | 57.6 |
| $TiCl_4$ | −30 | 136.4 |
| $AlCl_3$ | * | * |
| $FeCl_3$ | 282 | 315 |
| NaCl | 804 | 1413 |
| $CaCl_2$ | 772 | >1600 |

*$AlCl_3$ sublimes at a temperature of approximately 183° C. at a pressure of one atmosphere and melts at about 193° C. at a pressure of 2.3 atmospheres.

Quench absorber 16 is maintained with a top temperature of about 100° C. and a bottom temperature within the range of 165°–185° C. Under these conditions, the non-condensable gases and the more volatile metal chlorides such as $AlCl_3$, $SiCl_4$ and $TiCl_4$ are removed from the quench absorber in the form of a gas through line 18. It will be understood by those skilled in the art that the less volatile metal chlorides such as $FeCl_3$, $CaCl_2$ and NaCl remain in the liquid state in the quench absorber, and thus do not pass therefrom with the gaseous mixture through line 18. As shown in FIG. 1, the gaseous mixture of non-condensable gases and volatile metal chlorides passes from the quench absorber through line 18 to heat exchangers 20 and 22. Heat exchanger 20 is maintained at a temperature of about 60° C., which is sufficient to condense the majority of the metal chlorides in the mixture from line 18. This condensate from heat exchanger 20 is returned to quench absorber 16 through line 24. The gaseous mixture in heat exchanger 20 is passed on to heat exchanger 22. This second heat exchanger is maintained at a temperature of about −15° C., which is sufficient to condense essentially all of the remaining $TiCl_4$ and a portion of the remaining $SiCl_4$ in the mixture from heat exchanger 20. This condensate is returned to quench absorber 16 through line 26. Thus, this arrangement of the quench absorber and the heat exchangers serves to remove the non-condensable gases from the cooled mixture from the reactor and to liquify the metal chlorides for removal to distillation column A. The remaining gaseous $SiCl_4$ and the non-condensable gases from heat exchanger 22 are passed into chamber 70 through line 28. This chamber and its use are more particularly described in the copending, commonly owned patent application of Bush and Stewart, Ser. No. 40,938, entitled "Method of Removing a Low Boiling Point Metal Chloride from a Gaseous Stream".

The mixture of condensed metal chlorides from quench absorber 16 is passed from the bottom thereof through line 30 to first distillation column A. This distillation column is of the conventional type, having a reboiler, an associated refluxing means and condenser, and sufficient plates or packing to effect the desired separation.

As illustrated in FIG. 1, column A is operated at temperatures and pressures sufficient to separate $SiCl_4$ by distillation from the mixture obtained from quench absorber 16. Preferred results may be achieved when column A is operated at a pressure of about 4.5 atmospheres and at temperatures ranging from about 200° C. at the bottom of the column, to about 100° C. at the top of the column. By operating column A in this manner, substantially all of the $SiCl_4$ is separated from the mixture, removed from column A through line 32, and condensed in condenser A'. A portion of this condensed $SiCl_4$ is returned to column A as reflux through line 34, and the balance is returned to reactor 10 through line 36, because the addition of $SiCl_4$ to the reactor inhibits the further production of $SiCl_4$ therein.

Because the temperature in column A is not high enough to vaporize the $AlCl_3$, $FeCl_3$ and $TiCl_4$ therein, these undistilled chlorides are passed from the first column through feed line 38 to second conventional distillation column B. Column B is operated at temperatures and pressures sufficient to separate $TiCl_4$ by distillation from the remainder of the chlorides. Preferred results may be achieved when column B is operated at a pressure of about 4.5 atmospheres and at temperatures ranging from about 235° C. at the bottom of the column to about 190° C. at the top of the column. By operating column B in this manner, substantially all of the $TiCl_4$ is removed therefrom as a gas through line 40 to condenser B'. This gaseous $TiCl_4$ is condensed in condenser B' and liquid $TiCl_4$ exits condenser B' through line 42. A portion of this liquid is returned to column B through line 44 as reflux. A second portion may be passed to column A to prevent the condensation of $AlCl_3$ therein. This portion may be passed through lines 48, 50, 80 and 82 to enter the column above the point of entry of the mixture entering the column through line 30, or through lines 48, 50, 80, 84 and 86 to enter the column at the level of line 30. Alternatively, liquid $TiCl_4$ may be added upstream of column A, as at quench absorber 16 through lines 52 and 54, or to column A from outside source 90 through lines 88, 80 and 82 or 88, 80, 84 and 86.

According to the present invention, $TiCl_4$ is maintained in distillation column A in an amount sufficient to prevent condensation of $AlCl_3$ on the plates or packing in that column. It has been found that this undesirable condensation of $AlCl_3$ in the column may be prevented by insuring that the amount of $TiCl_4$ which is maintained in the column is at least as great, by weight, as the amount of $AlCl_3$ in the mixture which is admitted to the column through line 30. This may be accomplished by adding $TiCl_4$ to column A or upstream thereof, such as at quench absorber 16. The amount of $TiCl_4$ which should be added to column A or upstream thereof will vary depending on the amount of $TiCl_4$ already present in the effluent from reactor 10 and with the temperature and pressure conditions of the system. However, in order to insure that sufficient $TiCl_4$ is maintained in column A, it is recommended that an amount at least as great, by weight, as the amount of $AlCl_3$ in the mixture which is admitted to the column through line 30 be added to column A.

While FIG. 1 shows the addition of $TiCl_4$ to column A at the level of line 30 and above that level, it is within the scope of the invention to add additional $TiCl_4$ at a point adjacent to the bottom of the column if this becomes necessary to aid in the transport of the undistilled chlorides leaving the column to pass to column B. However, if the recommended amount of $TiCl_4$ is added above this point or upstream of column A, it may not be necessary to add $TiCl_4$ at the bottom of column A.

An additional portion of the $TiCl_4$ that passes out of condenser B′ through lines 42 and 48 may be cooled and introduced via lines 50, 52 and 76 into chamber 70, where it acts as a solvent for the gaseous $SiCl_4$ therein. This chamber and its use are more particularly described in the aforementioned application of Bush et al. As described therein, a liquid solution of $SiCl_4$ and $TiCl_4$ is removed from chamber 70 and passed through line 72 to quench absorber 16. The non-condensable gases which are not dissolved by the $TiCl_4$ in chamber 70 are removed through line 74 for further treatment (not shown). Finally, any portion of the $TiCl_4$ from condenser B′ that is not passed to quench absorber 16, or to column A or to chamber 70 may be removed from the system, as for example, through lines 48 and 78.

The undistilled chlorides, including $AlCl_3$ and $FeCl_3$, from column B pass through line 46 to conventional column C. Column C is operated at temperatures and pressures sufficient to separate $AlCl_3$ by distillation from the remainder of the chlorides. Preferred results may be obtained when column C is operated at a pressure of about 4.5 atmospheres and at temperatures ranging from about 350° C. at the bottom of the column to about 235° C. at the top of the column. It should be understood by those skilled in the art that if there are additional metallic chlorides in the gaseous stream from the chlorination reactor, such as NaCl or $CaCl_2$, these less volatile metallic chlorides will remain in the liquid state throughout the distillation process and will exit the third column through line 68 along with the $FeCl_3$.

Gaseous $AlCl_3$ passes from column C through line 56. A portion of this gas enters condenser C′ through line 58, whereupon it is condensed and returned to column C as reflux through line 60. The gaseous $AlCl_3$ which is not passed into condenser C′ flows through line 62 to condenser 64. This condenser converts gaseous $AlCl_3$ to solid $AlCl_3$ product, which is removed from the system through line 66.

Figure 2:
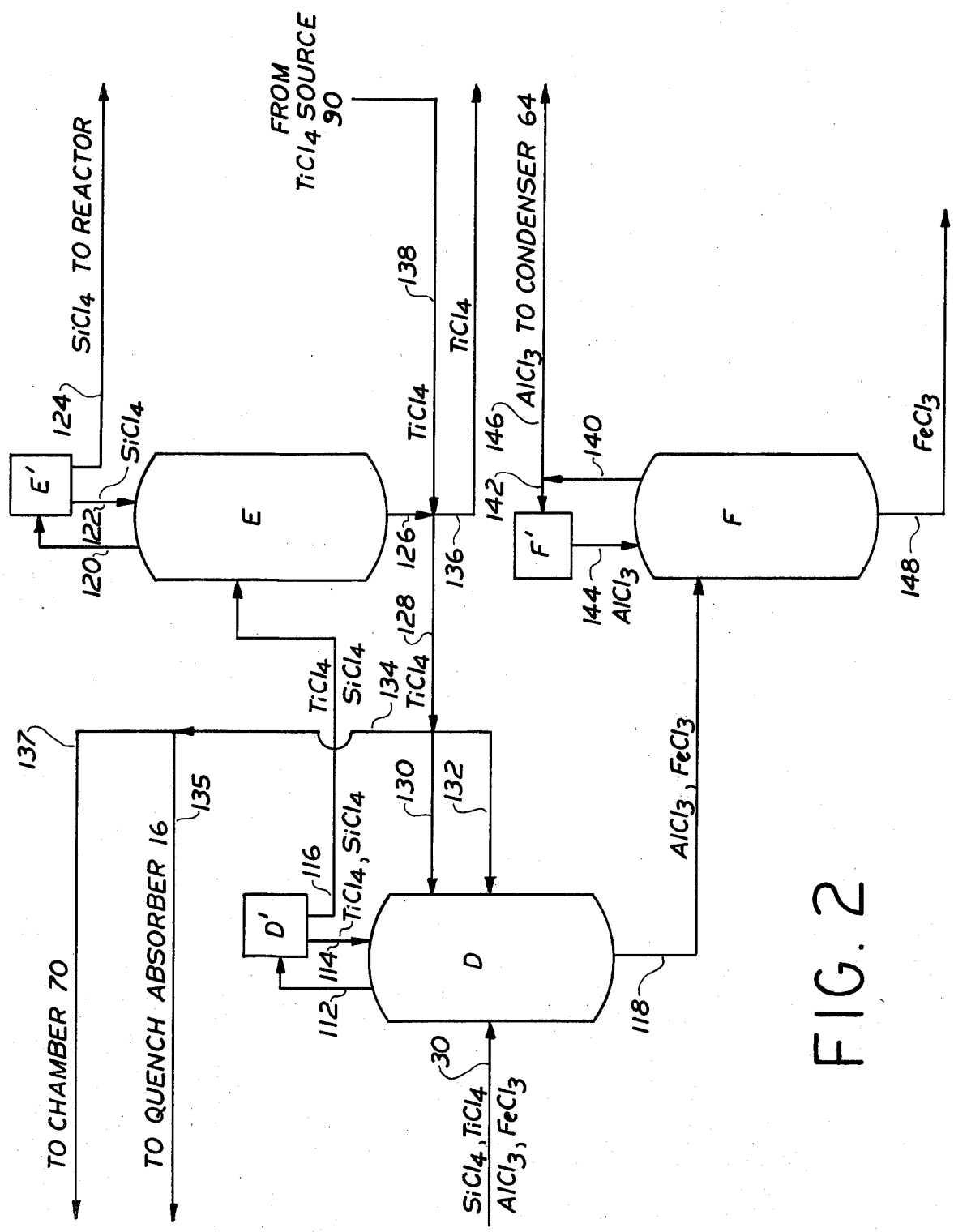
FIG. 2 is a schematic flow diagram generally illustrating an alternative array of distillation columns which may be utilized in place of the array of columns shown in FIG. 1.

An alternative array of distillation columns in which the present invention may be utilized is illustrated in FIG. 2. This array may be interchanged with the array of distillation columns shown in FIG. 1. As shown in FIG. 2, fractional distillation may be initiated by introducing the mixture from quench absorber 16 of FIG. 1 into distillation column D through line 30. This column is operated at temperatures and pressures sufficient to separate a fraction containing $SiCl_4$ and $TiCl_4$ by distillation from the mixture. Preferred results may be achieved when column D is operated at a pressure within the range of 4.0 to 4.5 atmospheres and at temperatures ranging from about 205° C. at the bottom of the column to about 190° C. at the top of the column. By operating column D in this fashion, substantially all of the $SiCl_4$ and $TiCl_4$ is separated from the mixture, removed from column D through line 112, and condensed in condenser D′. A portion of the condensate is returned to column D as reflux through line 114, and the balance is passed to column E through line 116. Since the temperature in column D is not high enough to vaporize the metal chlorides other than $SiCl_4$ and $TiCl_4$, the liquid remaining, containing $AlCl_3$ and $FeCl_3$, is passed from column D to column F through line 118.

Column E is operated at temperatures and pressures sufficient to separate $SiCl_4$ by distillation from the fraction obtained from column D. Preferred results may be achieved when column E is operated at a pressure within the range of 4.0 to 4.5 atmospheres and at temperatures ranging from about 205° C. at the bottom of the column to about 105° C. at the top of the column. Operation of column E at these temperatures and pressures allows the major portion of the $SiCl_4$ in the fraction obtained from column D to exit the column as a gas through line 120. This gas is condensed in condenser E′, and a portion of the condensate is returned to column E as reflux through line 122. The remainder of the condensed $SiCl_4$ is returned to reactor 10 via line 124. Since the temperature in column E is not high enough to vaporize the $TiCl_4$ therein, it is removed from the column as a liquid through line 126. A portion of this liquid $TiCl_4$ may be passed to column D through lines 128 and 130 or 128 and 132 to prevent the condensation of $AlCl_3$ therein. Alternatively, liquid $TiCl_4$ may be added upstream of column D, as at quench absorber 16 through lines 128, 134 and 135, or to column D from outside source 90 through lines 138, 128 and 130 or 138, 128 and 132. An additional portion of the $TiCl_4$ that passes out of column E through line 126 may be introduced via lines 128, 134 and 137 into chamber 70, where it acts as a solvent for the gaseous $SiCl_4$ therein. Finally, any portion of the liquid $TiCl_4$ from column E that is not passed to column D, or to quench absorber 16 or to chamber 70 may be removed from the system through lines 126 and 136.

The undistilled chlorides, including $AlCl_3$ and $FeCl_3$, from column D pass through line 118 to column F. Column F is operated at temperatures and pressures sufficient to separate $AlCl_3$ by distillation from the remainder of the chlorides. Preferred results may be obtained when column F is operated at a pressure of about 4.5 atmospheres and at temperatures ranging from about 350° C. at the bottom of the column to about 235° C. at the top of the column. It should be understood by those skilled in the art that if there are additional metallic chlorides in the gaseous stream from reactor 10, such as NaCl or $CaCl_2$, these less volatile chlorides will remain in the liquid state throughout the distillation process and will exit column F through line 148 along with the $FeCl_3$.

Gaseous $AlCl_3$ exits column F through line 140. A portion of this gas enters condenser F′ through line 142, whereupon it is condensed and returned to column F as reflux through line 144. The gaseous $AlCl_3$ which is not passed into condenser F′ flows through line 146 to condenser 64.

It should be understood that this description of the present invention is susceptible to various modifications, changes and adaptations, and that the same are intended to be encompassed within the meaning and range of equivalents of the appended claims.

What is claimed is:

1. A method for preventing the solidification of $AlCl_3$ in a fractional distillation column which is operated to separate a fraction which does not include $AlCl_3$ from a mixture containing $AlCl_3$ and other metal chlorides, comprising maintaining in the column an amount of TiCl$_4$ at least as great, by weight, as the amount of AlCl$_3$ contained in the mixture said amount of TiCl$_4$ being sufficient to prevent said solidification.

2. The method of claim 1 wherein the fractional distillation column is one column in an array of distillation columns which is operated to separate AlCl$_3$ from a mixture containing AlCl$_3$, FeCl$_3$, SiCl$_4$ and TiCl$_4$.

3. The method of claim 2 wherein the fractional distillation column is operated to separate SiCl$_4$ from a mixture containing AlCl$_3$, FeCl$_3$, SiCl$_4$ and TiCl$_4$.

4. The method of claim 2 wherein the fractional distillation column is operated to separate a fraction containing SiCl$_4$ and TiCl$_4$ from a mixture containing AlCl$_3$, FeCl$_3$, SiCl$_4$ and TiCl$_4$.

5. The method of claim 1 wherein the fractional distillation column is operated at temperatures which include the sublimation or melting points of AlCl$_3$ at the operating pressure of the column.

6. A process for the separation and recovery of AlCl$_3$ from a mixture containing metal chlorides including AlCl$_3$, FeCl$_3$, SiCl$_4$ and TiCl$_4$ comprising:
   (a) introducing the mixture into a first distillation column operated at temperatures and pressures sufficient to separate SiCl$_4$ by distillation from the mixture;
   (b) introducing the undistilled chlorides from the first column into a second distillation column operated at temperatures and pressures sufficient to separate TiCl$_4$ by distillation from the remainder of the chlorides;
   (c) adding liquid TiCl$_4$ to the first column in an amount, at least as great, by weight, as the amount of AlCl$_3$ contained in the mixture sufficient to prevent solidification of AlCl$_3$ in the first column;
   (d) introducing the undistilled chlorides from the second column into a third column to distill AlCl$_3$ from the remaining chlorides; and
   (e) recovering purified AlCl$_3$ by condensing the AlCl$_3$ vapors distilled from the third column.

7. The process of claim 5 wherein the TiCl$_4$ added to the first column is added with the mixture.

8. The process of claim 5 wherein at least a portion of the TiCl$_4$ added to the first column to prevent condensation of AlCl$_3$ is obtained from the second column.

9. The process of claim 5 wherein the first column is operated at a pressure of about 4.5 atmospheres and at temperatures ranging from about 200° C. at the bottom of the column to about 100° C. at the top of the column.

10. The process of claim 9 wherein the second column is operated at a pressure of about 4.5 atmospheres and at temperatures ranging from about 235° C. at the bottom of the column to about 190° C. at the top of the column.

11. The process of claim 10 wherein the third column is operated at a pressure of about 4.5 atmospheres and at temperatures ranging from about 350° C. at the bottom of the column to about 235° C. at the top of the column.

12. A process for the separation and recovery of AlCl$_3$ from a mixture containing metal chlorides including AlCl$_3$, FeCl$_3$, SiCl$_4$ and TiCl$_4$ comprising:
   (a) introducing the mixture into a first distillation column operated at temperatures and pressures sufficient to separate a fraction containing SiCl$_4$ and TiCl$_4$ by distillation from the mixture;
   (b) introducing at least a portion of the fraction separated from the first column into a second distillation column operated at temperatures and pressures sufficient to separate SiCl$_4$ by distillation from the fraction obtained from the first column;
   (c) adding sufficient liquid TiCl$_4$, in an amount at least as great as the amount, by weight, of the AlCl$_3$ contained in the mixture, to the first column to prevent solidification of AlCl$_3$ in the first column;
   (d) introducing the undistilled chlorides from the first column into a third column to distill AlCl$_3$ from the undistilled chlorides obtained from the first column; and
   (e) recovering purified AlCl$_3$ by condensing the AlCl$_3$ vapors distilled from the third column.

13. The process of claim 12 wherein the amount of TiCl$_4$ added to the first column is at least as great, by weight, as the amount of AlCl$_3$ contained in the mixture.

14. The process of claim 13 wherein the TiCl$_4$ added to the first column is added with the mixture.

15. The process of claim 13 wherein at least a portion of the TiCl$_4$ added to the first column to prevent solidification of AlCl$_3$ is obtained from the second column.

16. The process of claim 13 wherein the first column is operated at a pressure within the range of 4.0 to 4.5 atmospheres and at temperatures ranging from about 205° C. at the bottom of the column to about 190° C. at the top of the column.

17. The process of claim 16 wherein the second column is operated at a pressure within the range of 4.0 to 4.5 atmospheres and at temperatures ranging from about 205° C. at the bottom of the column to about 105° C. at the top of the column.

18. The process of claim 17 wherein the third column is operated at a pressure of about 4.5 atmospheres and at temperatures ranging from about 350° C. at the bottom of the column to about 235° C. at the top of the column.

* * * * *

UNITED STATES PATENT AND TRADEMARK OFFICE
CERTIFICATE OF CORRECTION

PATENT NO. : 4,385,964

DATED : May 31, 1983

INVENTOR(S) : Roger C. Johnson et al

It is certified that error appears in the above-identified patent and that said Letters Patent are hereby corrected as shown below:

| | |
|---|---|
| Col. 4, line 9 | After "$TiCl_4$" delete --and--. |
| Claim 7, Col. 9, line 41 | Change "claim 5" to --claim 6--. |
| Claim 8, Col. 9, line 43 | Change "claim 5" to --claim 6--. |
| Claim 9, Col. 9, line 46 | Change "claim 5" to --claim 6--. |

Signed and Sealed this

Twenty-sixth Day of July 1983

[SEAL]

Attest:

GERALD J. MOSSINGHOFF

Attesting Officer     Commissioner of Patents and Trademarks